United States Patent [19]

Stein

[11] Patent Number: 4,542,879

[45] Date of Patent: Sep. 24, 1985

[54] VALVE RING ARRANGEMENTS IN METALLIC VALVES, CONTROL VALVES, CONDENSATE REMOVAL DEVICES, AND OTHER MEANS FOR THE PREVENTION OF LEAKAGES DUE TO CORROSION

[75] Inventor: Marcel Stein, New York, N.Y.

[73] Assignee: Marbor Engineering Associates, New York, N.Y.

[21] Appl. No.: 441,096

[22] Filed: Nov. 12, 1982

Related U.S. Application Data

[63] Continuation-in-part of Ser. No. 325,361, Nov. 27, 1981, abandoned.

[51] Int. Cl.[4] ............................................. F16K 25/00
[52] U.S. Cl. ..................................... 251/360; 251/363
[58] Field of Search ................... 251/360, 363 X, 318, 251/362

[56] References Cited

U.S. PATENT DOCUMENTS

| | | | |
|---|---|---|---|
| 571,833 | 11/1896 | Hunter | 251/360 X |
| 1,586,346 | 5/1926 | Wilson | 251/363 X |
| 2,172,073 | 9/1939 | Smith | 251/360 |
| 2,247,976 | 7/1941 | Titus | 251/360 X |
| 2,271,274 | 1/1942 | O'Donnell | 251/360 X |
| 2,735,047 | 2/1956 | Garner et al. | 251/360 X |

Primary Examiner—William E. Tapolcai

[57] ABSTRACT

A valve ring arrangement is disclosed in which the corrosion sensitive parts of shut-off valves, control valves and condensate-removal devices are kept out of contact with condensate accumulations. Also disclosed are float and bucket-type condensate-removal devices which are protected against shutdown corrosion by means of automatically draining them during shutdowns.

18 Claims, 10 Drawing Figures

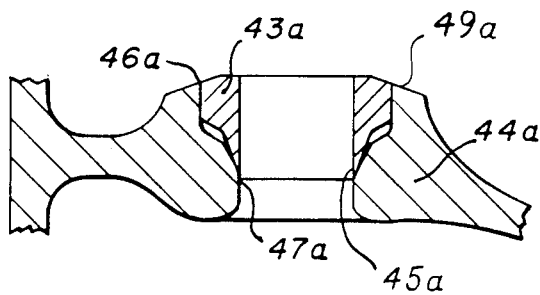
FIG. 4a
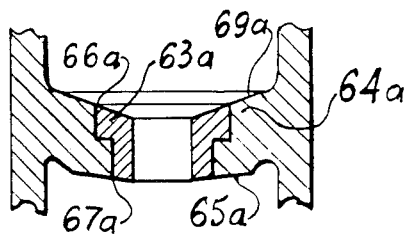
FIG. 6a
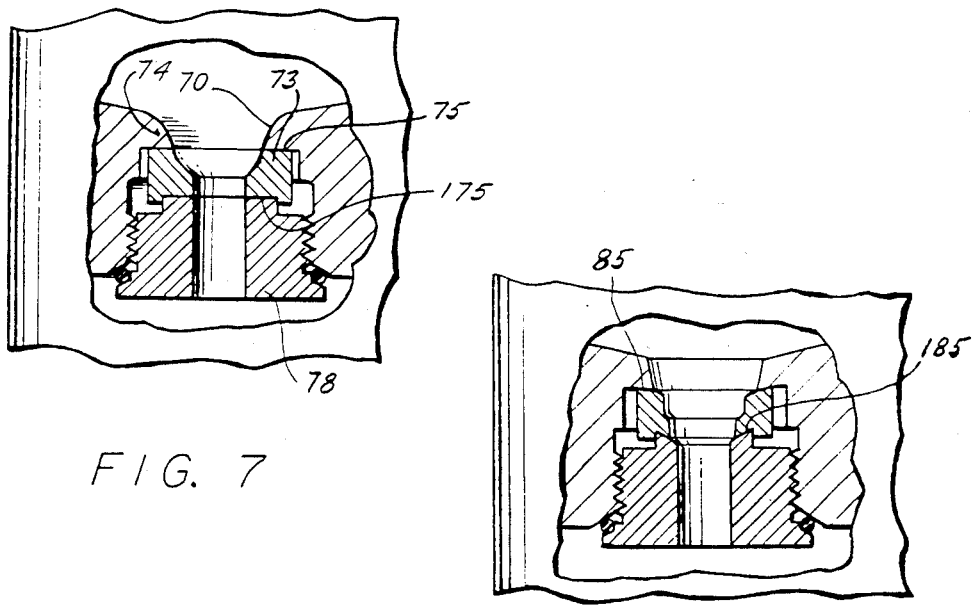
FIG. 7
FIG. 8

VALVE RING ARRANGEMENTS IN METALLIC VALVES, CONTROL VALVES, CONDENSATE REMOVAL DEVICES, AND OTHER MEANS FOR THE PREVENTION OF LEAKAGES DUE TO CORROSION

This is a continuation-in-part of U.S. Ser. No. 325,361 filed Nov. 27, 1981, abandoned.

The present invention relates to shut-off valves, control valves and condensate-removing devices in which the corrosion-sensitive parts are maintained out of contact with condensate accumulations so that corrosion attack cannot occur at critical locations.

Corrosion, mainly shutdown corrosion is the cause of many malfunctions and waste of energy in steam systems. Many attempts have been made to come up with designs which would overcome corrosion. However, none of these ideas has been effective because they were either cumbersome, expensive or they failed to address the real cause of the problems.

Accumulation of any amount of condensate on a machined iron surface will eventually cause corrosion. Differential aeration currents develop in the condensate as oxygen is absorbed from the ambient atmosphere. The resulting galvanic potential difference leads to anodic corrosion at the locations with the lower oxygen concentration, i.e. at points farthest from the exposed water surface. Area especially susceptible to corrosion are machined surfaces, where the granule interfaces are exposed. Typical points of corrosion are valve seats, sealing surfaces between valve rings and valve bodies. Corrosion will attack stainless steel as well as cast iron components, although its damage on the former proceeds more slowly.

The importance of this corrosion process has gone hitherto undetected because it is masked by erosion damage. Condensate residual at the interface of the valve ring and the valve body starts corrosion on the body and continues to corrode until a hole, i.e., a by-pass is created. Through this by-pass steam and condensate can escape uncontrolled as further corrosion and erosion increase the significance of the by-pass passage. The ensuing ever increasing by-pass flow interferes with the operation of the controlled valve, forcing it to be operated with increasing frequency at a nearly closed position. Such operation entails excessive erosion of the valve disc and of the valve seat, and finally the breakdown of the automatic control process. Typically, when the valve is at last inspected, inspectors seeing the eroded disc and seat are satisfied with this finding and do not proceed with further investigation. Therefore, the main reason for the erosion of the disc and seat, namely the hidden gap in the corroded body, remains undetected.

It is an object of this invention to provide a valve construction in which the accumulation of condensate at corrosion susceptible surfaces is prevented, thereby preventing corrosion, especially shutdown corrosion.

In one embodiment of the invention the interfacing sealing surfaces between the valve ring and the valve ring boss of a valve body are elevated above the level of any possible condensate accumulation. The outer peripheral surfaces of the valve ring and of the valve ring boss form a continuous vertical or monotonically declining mantle. The valve ring boss is that part of the body into which the valve ring is installed. Gravity prevents any significant accumulation of condensate anywhere on the mantle leaving the critical sealing surfaces clear of condensate.

Another embodiment of the invention relates to steam valves, steam control valves and to valves of condensate removing devices open during shutdowns. In this embodiment the valve ring is installed into the body from the bottom. The inner peripheral surfaces of the valve ring and the valve ring boss form a continuous vertical or monotonically declining mantle. Gravity prevents any significant accumulation of condensate anywhere on the mantle, leaving critical surfaces clear of condensate.

It must be observed that benefits of the best designed steam control device will be negated by inappropriate installation or by the selection of an inappropriate model.

Several embodiments of the invention will be described in detail below with the aid of the accompanying drawings in which:

FIG. 4a illustrates the cross section of a valve seat arrangement designed to prevent corrosion wherein the valve ring or the valve seat insert is installed directly into the valve body by means of an interference fit or welds;

FIGS. 5, 6, 7 and 8 are cross sections of valve ring and body arrangements designed to prevent corrosion in angle valves;

FIG. 6a is a fragmentary cross section of an interference fit or weld embodiment of the invention.

Figure 1:
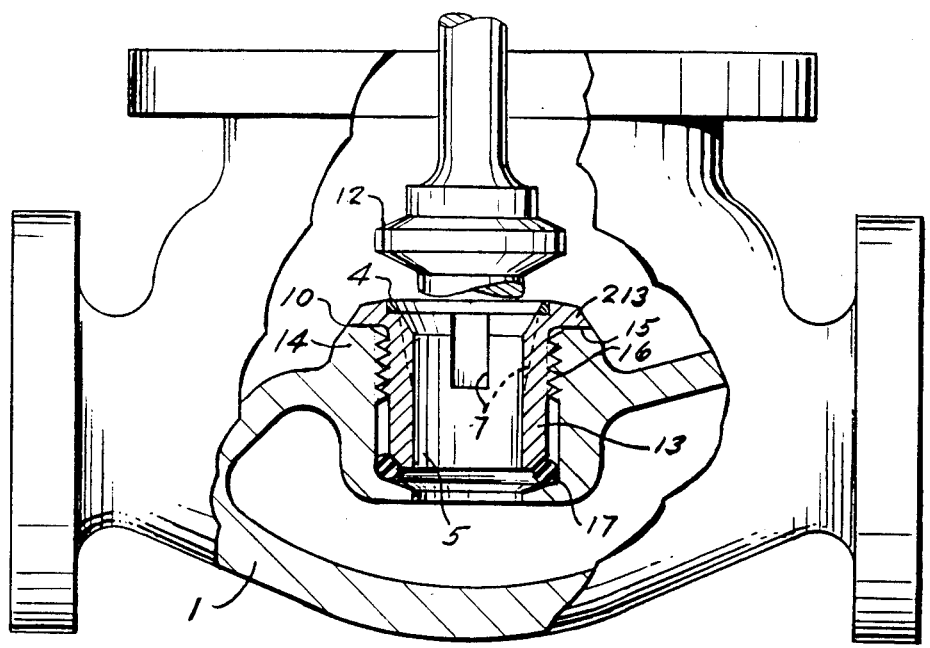
FIGS. 1 and 2 are cross sections of a globe steam valve, both angle and straight through, with a valve ring and body designed to prevent corrosion according to the invention.

FIG. 1 shows an embodiment of the invention designed for through and angle globe valves. In the embodiment of FIG. 1 a valve ring 13 is installed in a valve ring boss 14, the latter being a part of the valve body 11. The valve ring 13 is typically made of alloy steel and incorporates a hardened valve seat insert 4. The valve seat insert 4 is designed so that an obtuse edge establishes a single line contact with the valve disc 12. On the inside surface 5 of the valve ring 13 a number of grooves 7 are machined, to be used during assembly in a way well known in the art. The outside peripheral surfaces of the valve ring collar 213 and the valve ring boss 14 are machined after assembly to produce a conical or vertical surface 10 as one of the facets of a mantle formed by the outer surfaces of the valve ring 13 and the valve ring boss 14 without any possible ridges. Any water condensed on this mantle will drain down due to gravity, away from the sealing surfaces 15.

In the embodiment of FIG. 1, the valve ring 13 is fastened into the valve ring boss 14 by a threaded connection 16. The sealing surfaces 15 between the valve ring 13 and the valve ring boss 14 are planar. An adequate seal is provided either by appropriate machining of the sealing surfaces 15 or by the application of a sealant coat or a gasket (not shown) between the sealing surfaces. A seal ring 17, made of a resilient material, is provided to prevent moisture from accumulating at the threads 16 of the valve ring boss 14 and to minimize the access of air to these threads during shutdown. The components around the seal ring 17 are designed to constrain it during assembly.

Figure 2:
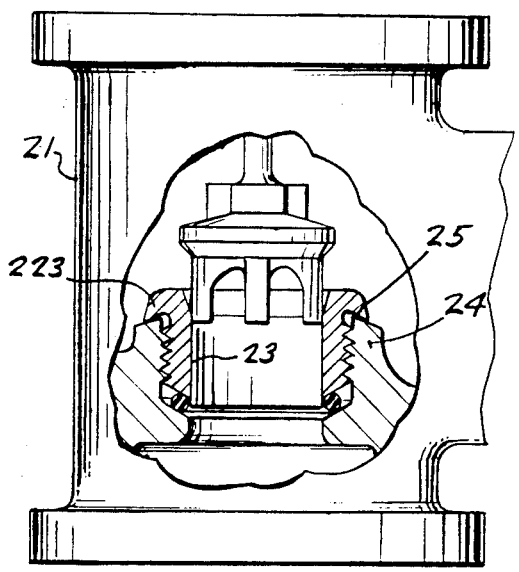
Figure 3:
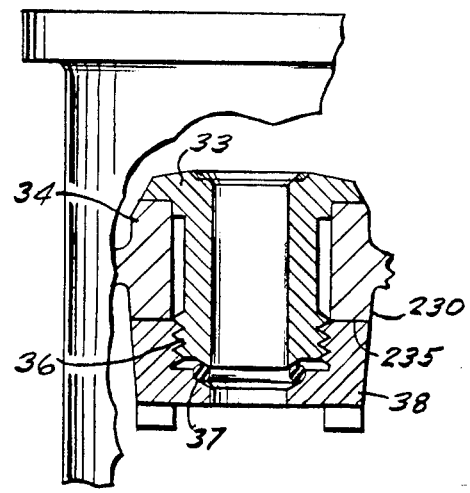
FIGS. 3 and 4 are cross sections of valve ring and body arrangements applicable to angle valves which are designed to prevent corrosion.
Figure 4:
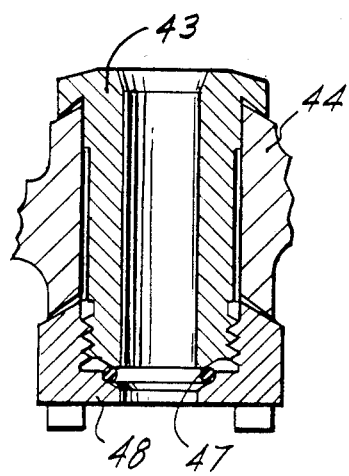

In FIGS. 2 through 4, which show variations of the embodiment of FIG. 1, reference numerals for elements that are common to the embodiment of FIG. 1 are not repeated in these figures, nor are those common elements further described in the following description of the embodiments of FIGS. 2-4.

The embodiment shown in FIG. 2 is identical to the one shown in FIG. 1, except that the sealing surfaces 25 of the valve ring 23 and the valve ring boss 24 are conical instead of being planar. The angle of the cone forming the top of the valve ring boss 24 is larger than the angle of the cone forming the bottom of the valve ring collar 223. When the valve ring 23 is tightened into the valve ring boss 24 during assembly, the perimeter of the valve ring collar 223 forms a line contact with the top of the valve ring boss 24. The line contact results in a steam-tight metal-to-metal seal due to elastic deformation of the sealing surfaces 25. No machining of the outer peripheral surfaces of the valve ring or valve ring boss is necessary after assembly.

FIG. 3 shows an embodiment of the invention designed for angle globe valves. The valve ring 33 and valve ring boss 34 assembly are identical to those of the embodiment shown in FIG. 1 except that the valve ring 33 is fastened to the valve ring boss 34 by means of a valve ring nut 38 via a threaded connection 36 between the ring and the nut. The valve ring nut 38 and the bottom of the valve ring boss 34 are machined after assembly to form a single vertical or conical facet 230. This facet 230 and the bottom periphery of the valve ring boss 34 form a continuous mantle along which any condensate drains away from the planar sealing surfaces 235. A seal ring 37 is compressed between the valve ring 33 and the valve ring nut 38 to form a bottom seal.

The embodiment shown in FIG. 4 is identical to the one shown in FIG. 3 except that it includes conical interfaces between the valve ring 43 and the valve ring boss 44 as well as between the valve ring boss 44 and the valve ring nut 48. Machining of peripheral surfaces after assembly is obviated in this embodiment.

FIG. 4a shows an embodiment of the invention for use in shut-off valves. The valve seat insert 43a, or the valve ring, if necessary is inserted into the valve ring boss 44a from the top, fastened to it and sealed by means of interference fits or welds at strategic points, i.e., at the inner periphery 47a and at the top periphery 46a of the insert recess. For the interference fit the valve seat insert or valve ring 43a is chilled and the valve ring boss 44a is heated prior to assembly. Then the valve ring is inserted into the insert recess until contact is established at the inner periphery 47a. The components are designed so that first contact between the valve ring and valve ring boss is established at the top periphery 46a of the insert recess while the valve ring warms up and the valve ring boss cools down. This prevents subsequent relative movement of the components. Further expansion of the valve ring, and contraction of the valve ring boss causes intimate contact and sealing between the valve insert or valve ring 43a and the valve ring boss 44a also at the inner periphery 47a of the insert recess. For either method of fastening, the surfaces 45a and 49a at the interfaces between the valve seat insert 43a and the valve ring boss 44a are machined after assembly to eliminate any discontinuities and to produce a continuous mantle. Along this continuously descending mantle any water condensed will be drained away by gravity from the sealing surfaces at the top and inner peripheries 46a and 47a.

Alternate embodiments for angle valves, based on the embodiments shown in FIGS. 1 through 4a, may be implemented by installing the valve ring from the bottom and the valve ring nut, if needed, from the top. For such alternate embodiments the above described components must be properly modified to ensure proper drainage of the condensate.

In the embodiments of the invention illustrated in FIGS. 5 through 8, the bodies and the valve rings are designed to prevent corrosion in control valves or steam traps which are open during shutdown, such as, in thermostatic steam traps.

Figure 5:
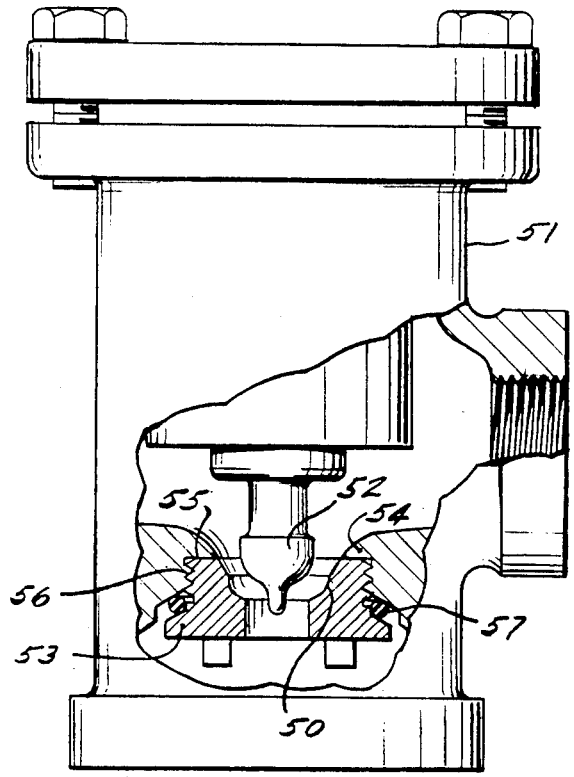

In the embodiment of FIG. 5 the body of a thermostatic steam trap is designated by 51, a valve plug by 52, a valve ring by 53, a sealing lip of the body by 54, sealing surfaces between the valve ring and the body by 55, a threaded connection between the valve ring and the body by 56, and an elastic seal ring by 57. Valve ring 53 is fastened into the body from the bottom by means of a threaded connection 56. The sealing surfaces 55 are planar according to the design of the embodiment of FIG. 1. The inside peripheral surface of the valve ring 53 and the inside peripheral surface of the seal lip 54 form a monotonically declining mantle 50 along which condensate drains down as soon as the valve plug 52 is lifted. Seal ring 57 is compressed by the valve ring to seal the threads from steam, condensate and air. In order to eliminate any ridges which might sustain condensate accumulation, it is advisable to machine the mantle at the seal lip 54 and valve ring 53 interface after installatiion of the valve ring.

Figure 6:
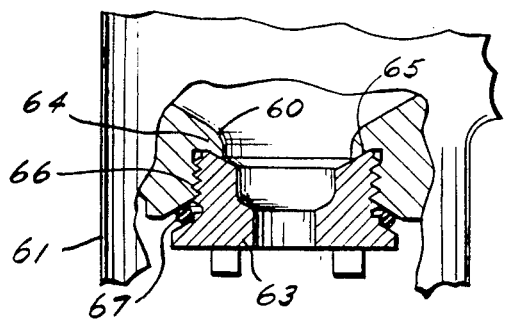

In the embodiment of FIG. 6 sealing surfaces 65 between the valve ring 63 and the seal lip 64 of the body 61 have inverted cone shapes. Valve ring 63 is fastened into the body 61 from the bottom by means of a threaded connection 66. The inside peripheral surfaces of the valve ring 63 and of the seal lip 64 form a monotonically declining mantle 60 along which any condensate drains down as soon as the valve plug 62 is lifted.

FIG. 6a shows an embodiment of the invention for the prevention of corrosion in control valves or steam traps which are open during shutdown, e.g., thermostatic steam traps in which interference fits or welds are used to fasten or seal the valve ring 63a in the valve ring boss 64a as described in connection with FIG. 4a. A suitable sealing compound may be applied along the sealing surfaces. The top surface 69a and the bottom surface 65a are machined after assembly and are declining in the direction of the inner periphery of the valve ring 63a to provide perfect drainage of the mantles when the valve is open.

The embodiment shown in FIG. 7 is identical to the one shown in FIG. 5 except that the valve ring 73 itself is not threaded but is fastened into the body by means of a threaded ring 78. This embodiment minimizes the size of the valve ring 73 and the machining required for it, permitting the use of a harder alloy. The sealing surfaces are 75 between the seal lip 74 and the valve ring 73 on the one hand and 175 between the valve ring 73 and the threaded ring 78 on the other. The sealing surfaces 75 and 175 are planar according to the design of the embodiment shown in FIG. 1. Accordingly, the mantle 70 must be machined after assembly to eliminate ridges at the interfaces.

The embodiment shown in FIG. 8 is identical to the one shown in FIG. 7, except that the sealing surfaces 85 and 185 are characterized by a conical design, as described with respect to the embodiment of FIG. 2. The embodiment of FIG. 8 obviates the machining of the mantle because the mantle is monotonically declining without any possible ridges. The embodiments of FIG. 6 or FIG. 8 lend themselves for a two-way throttling of the flowing medium in cooperation with a properly designed plug.

What is claimed is:

1. A shutoff valve for a steam distribution system wherein condensate accumulates as the system is shut down, said valve comprising a valve body with a valve ring boss, a valve ring having a valve ring collar inserted into the valve ring boss, the valve ring and the valve ring boss having interfacing sealing surfaces therebetween which are located above the level of any possible condensate accumulation inside the valve body, the valve ring and the valve ring boss having sloping surfaces all around the interfacing sealing surfaces which together form a monotonically declining continuous mantle, said mantle declining away from the interfacing sealing surfaces to thereby ensure complete drainage of condensate from the sealing surfaces and the mantle.

2. A shut-off valve according to claim 1, wherein the interfacing sealing surfaces between the valve ring and the valve ring boss are perpendicular to the valve ring axis, and the valve ring collar and the valve ring boss are machined after assembly to produce a single continuous cylindrical or conical facet straddling the sealing surface thereby ensuring that surface discontinuities, which might retain condensate in contact with a machined surface, are eliminated.

3. A shut-off valve according to claim 1, wherein the interfacing sealing surfaces between the valve ring and the valve ring boss are upright conical and the interfacing sealing surface of the valve ring boss extends to or beyond the sealing surface of the valve ring to form a part of monotonically declining continuous mantle.

4. A shut-off valve according to claim 3, wherein the cone angle of the interfacing sealing surface of the valve ring is smaller than the cone angle of the valve ring boss, providing a single line sealing contact along the perimeter of the interfacing surface of the valve ring.

5. A shut-off valve according to any of claims 1 through 4, wherein the valve ring is fastened into the valve ring boss by means of a threaded connection sealed by means of an elastic ring.

6. A shut-off valve according to claim 1, wherein a valve ring is fastened into the valve ring boss and sealed by means of interference fits or welds.

7. A shut-off valve according to claim 1, wherein the valve ring is fastened into the valve ring boss by means of a nut threaded onto the valve ring, whereby the peripheral surfaces of the nut and the valve ring boss form a monotonically declining continuous mantle ensuring its complete drainage, and the threaded connection between the nut and the valve ring is sealed by means of an elastic ring.

8. A shut-off valve according to claim 7, wherein the interfacing sealing surface between the valve ring and the valve ring boss, as well as the interfacing sealing surfaces between the nut and the valve ring boss are perpendicular to the valve ring axis, and the valve ring collar and the valve ring boss, as well as the valve ring boss and the valve ring nut are machined to form continuous cylindrical or conical facets straddling the respective sealing surfaces, thereby ensuring that surface discontinuities, which might retain condensate, are eliminated.

9. A shut-off valve according to claim 7, wherein the interfacing sealing surfaces between the valve ring and the valve ring boss, as well as the sealing surfaces between the nut and the valve ring boss are upright conical and the lower sealing surfaces extend to or beyond the outer perimeters of the respective upper sealing surfaces to form parts of the monotonically declining continuous mantles.

10. A shut-off valve according to claim 9, wherein the cone angle of the respective upper sealing surface between the valve ring and the valve ring boss, as well as the cone angle between the valve ring nut and valve ring boss are smaller than the respective cone angles of the lower interfacing sealing surfaces providing single line sealing contacts along the outer perimeter of the upper sealing surface.

11. A control valve for a steam distribution system wherein condensate accumulates as the system is shut down, said control valve comprising a valve body with a valve ring boss, a valve ring inserted into the valve ring boss, the valve ring and the valve ring boss having interfacing sealing surfaces therebetween, said valve ring being inserted from the bottom in such a way that a monotonically declining continuous hollow mantle is formed by the inner perimeter surfaces of the valve ring boss and the valve ring, said mantle declining away from the interfacing sealing surfaces to thereby ensure complete drainage of condensate from the interfacing sealing surfaces and the mantle.

12. A control valve according to claim 11, wherein the interfacing sealing surfaces between the valve ring and the valve ring boss are perpendicular to the valve ring axis, and the surface of the monotonically declining continuous hollow mantle defines a single continuous facet straddling the sealing surface plane.

13. A control vavle according to claim 11, wherein the interfacing sealing surfaces between the valve ring and the valve ring boss are inverted conical and wherein the ring's sealing surface extends inward to or beyond the perimeter of the sealing surface of the vavle ring boss.

14. A control valve according to claim 13, wherein the cone angle of the interfacing sealing surface of the valve ring boss is smaller than the cone angle of the interfacing sealing surface of the valve ring providing a single line sealing contact along the perimeter of the sealing surface of the valve ring boss.

15. A control valve according to any of claims 11 to 14, wherein the valve ring is fastened into the valve ring boss by means of a threaded connection sealed by means of an elastic ring.

16. A control valve according to claim 11, wherein a valve ring is fastened into the valve ring boss by means of a plug via a threaded connection between a plug and the valve ring boss and sealed by an elastic ring, and wherein the interfacing sealing surface between the valve ring and the valve ring boss, as well as between the valve ring and the plug are perpendicular to the valve ring axis, and wherein the monotonically declining continuous hollow mantle defines a single continuous facet straddling the sealing surface plane.

17. A control valve according to claim 16, wherein the respective interfacing sealing surfaces between the valve ring and the valve ring boss, as well as between the valve ring and the plug are inverted conical, and wherein the sealing surfaces at the top of the valve ring and of the plug extend to or beyond the perimeter of the respective sealing surfaces of the valve ring boss and at the bottom of the valve ring forming parts of the monotonically declining continuous hollow mantle.

18. A control valve according to any of claims 11 to 14, wherein the valve ring is fastened into the valve ring boss and sealed by means of interference fits or welds.

* * * * *